Figure 1:
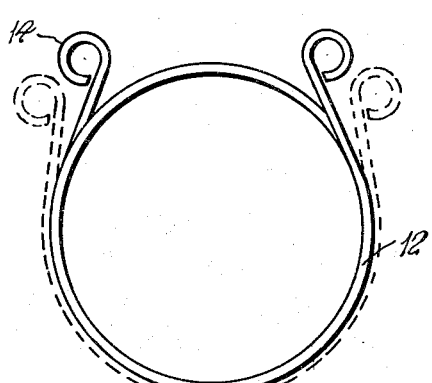

June 12, 1962     J. F. KULBERG ETAL     3,038,224
CLAMP ASSEMBLY

Filed Sept. 23, 1959     3 Sheets-Sheet 1

INVENTORS.
JOHN F. KULBERG
PAUL M. BRYANT
BY
Louis B. Applebaum
ATTORNEY

June 12, 1962  J. F. KULBERG ETAL  3,038,224
CLAMP ASSEMBLY
Filed Sept. 23, 1959  3 Sheets-Sheet 3

INVENTORS
JOHN F. KULBERG
PAUL M. BRYANT
BY
Louis B. Applebaum
ATTORNEY

United States Patent Office 3,038,224
Patented June 12, 1962

3,038,224
CLAMP ASSEMBLY
John F. Kulberg, Stratford, Conn., and Paul M. Bryant, Northridge, Calif., assignors to the United States of America as represented by the Secretary of the Navy
Filed Sept. 23, 1959, Ser. No. 841,914
9 Claims. (Cl. 24—81)

This invention relates to clamping devices and especially to a clamp assembly capable of securely retaining a plurality of members in a predetermined fixed spatial relationship with each other.

It is frequently necessary to maintain a number of members in fixed spatial relationship to each other. For example, in modern aircraft engine exhaust systems, the ejector stacks are led rearwardly from the cylinder heads and come into parallel adjacency in groups of two or more, emerging from the engine nacelle in this number or in larger numbers. At or before their exit from the nacelle, the groups must be supported and immobilized, for the reasons that not only are the ordinary or subresonant vibrations of these stacks sufficient to eventually cause displacement and distortion thereof, but since the vibrations transmitted to the stacks by the engine are cumulative, they gradually build up to their resonant frequency. These resonant vibrations react upon the engine stack connections and augment engine vibrations, rupture the connections or displace or distort the stacks.

Other types of piping systems such as plumbing systems may similarly require support and spacing for various reason.

The present invention provides a simple, inexpensive method of fastening several members together in a spaced relationship. Its object and advantages are accomplished by utilizing individual clamping elements to clamp each member, grouping the members and clamping elements around a spacing element and bolting the clamping and spacing elements together to form a clamping assembly. In a typical embodiment which is used to clamp cylindrical tubes, the clamping elements are circular torsion springs with closed loop ends, the normal internal diameter of each clamping element being expandable in response to pressure on the loop ends. The spacing element can be formed from leaf spring elements swaged together near their ends, one end of each leaf spring then being formed into a loop. The assembled spacing element is then placed interiorly of the clamping elements and the loops of the spacing element and clamping elements are bolted together to form the complete clamping assembly.

An object of this invention is to maintain a number of members in fixed spatial relationship to each other.

Another object is to provide a simple, inexpensive means for clamping together a number of members in fixed spatial relationship to each other.

Figure 2:
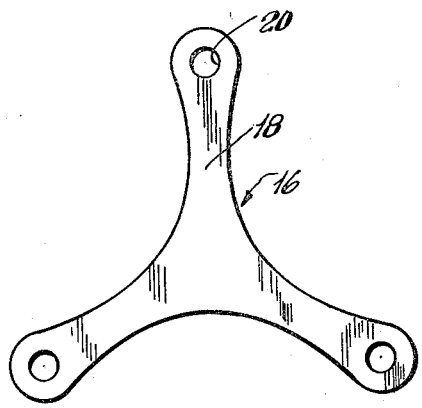
Figure 3:
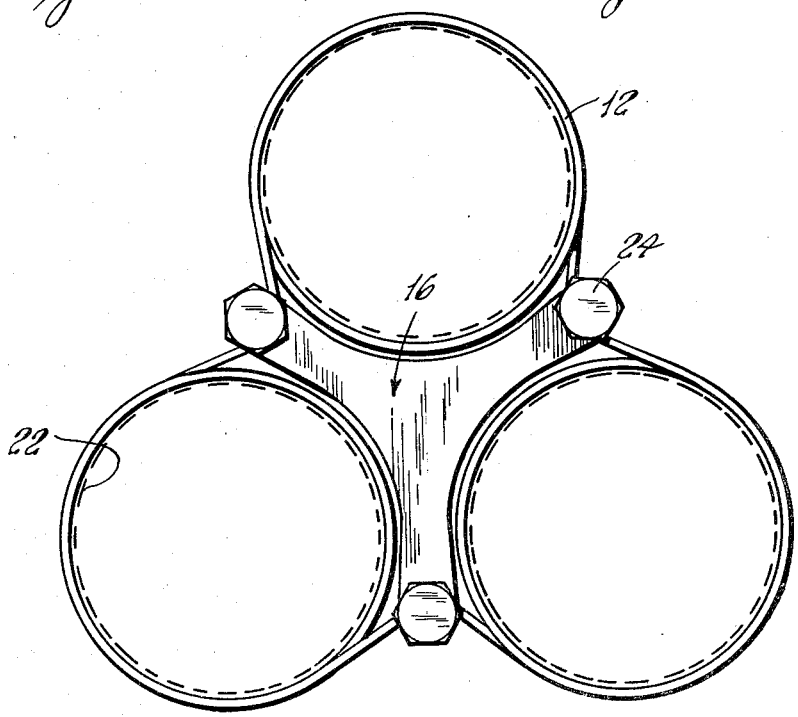
Figure 4:
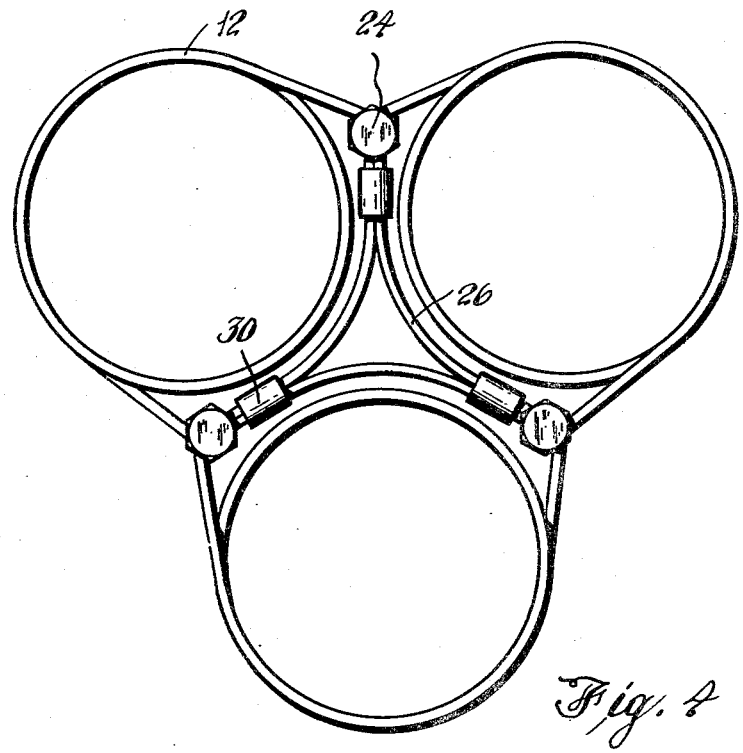
Figure 5:
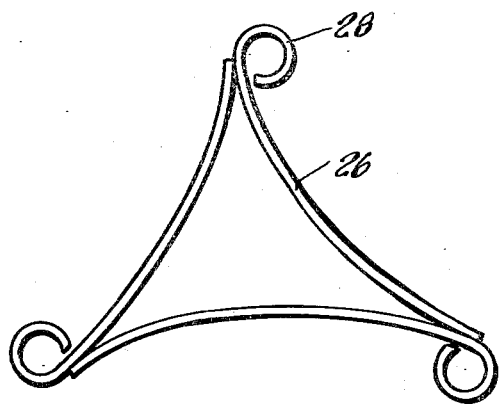
Figure 6:
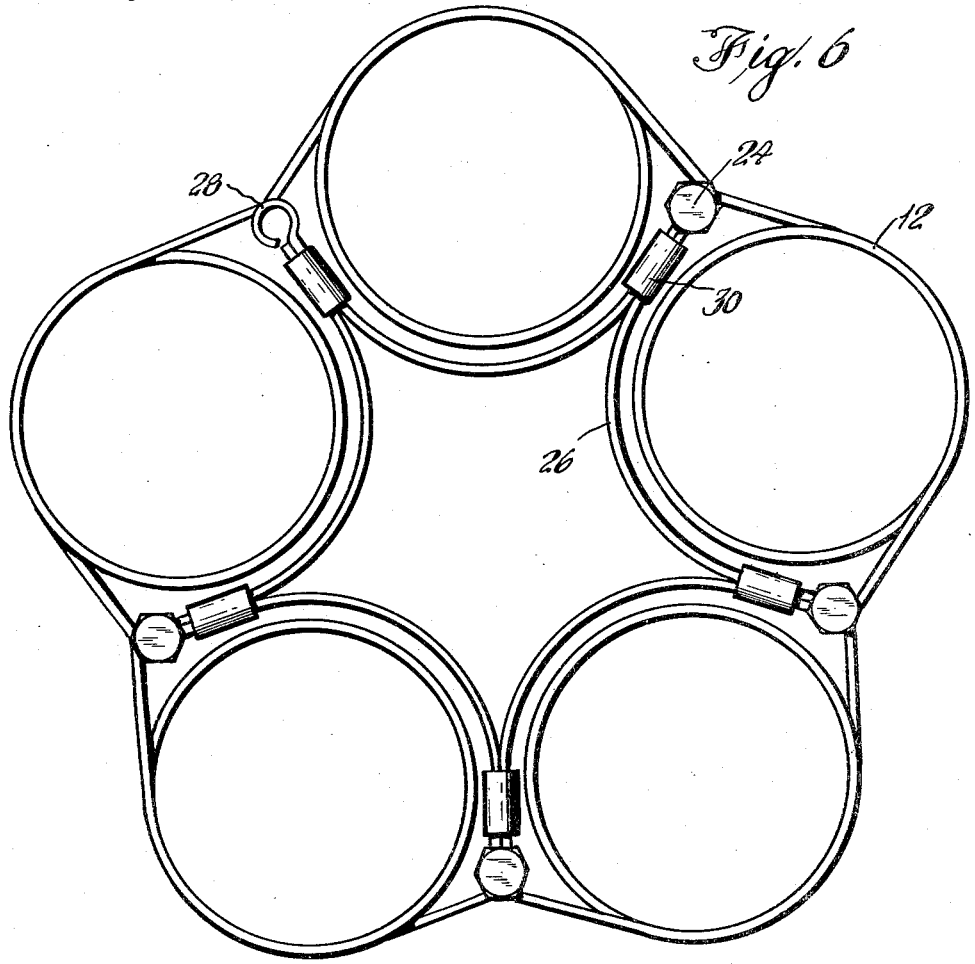
Figure 7:
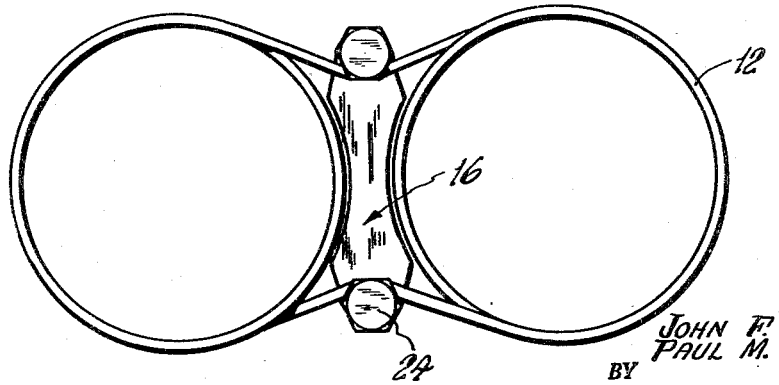

Other objects and many of the attendant advantages of this invention will be readily appreciated as the same becomes better understood by reference to the following detailed description when considered in connection with the accompanying drawings wherein:

FIG. 1 is a plan view of a clamping element;
FIG. 2 is a plan view of a spacing element;
FIG. 3 is a plan view of a clamping assembly employing three clamping elements;
FIG. 4 is a plan view of a clamping assembly employing a different type of spacing element;
FIG. 5 is a plan view of the spacing element assembly employed in the embodiment of FIG. 4;
FIG. 6 is a plan view of a clamping assembly used to clamp five tubular members; and
FIG. 7 is a plan view of a clamping assembly used to clamp two tubular members.

Similar reference characters apply to similar elements in the different views.

FIG. 1 shows a clamping element formed in the shape of a central loop of wire 12 with a small closed loop 14 at each end, the loops 14 extending outside of the circular area. The clamping element is fabricated from a resilient material such as spring steel and constitutes a torsion spring. Spreading the end loops 14 apart enlarges the inner diameter of the central loop of wire 12.

FIG. 2 illustrates one type of spacing element 16 which can be used in a clamping assembly intended to clamp three tubular members. This spacing element 16 is a plate separator formed from a piece of rigid material, such as steel, having three arms 18 spaced 120 degrees from each other. The edges of the arms 18 are inwardly or concavely curved and a bolt hole 20 is bored through each arm 18 near its end.

Three clamping elements 12 and a spacing element 16 are shown in FIG. 3 as they appear in a consolidated clamping assembly. The spacing element 16 is placed interiorly of the clamping elements 12 and the clamped tubes, the inner wall 22 of each tube being indicated in the drawing by a dotted circle. A bolt 24 extends through each bolt hole 20 of the spacing element 16 and through one of the end loops 14 of each of the two clamping elements nearest said bolt hole 20. (The nut for each bolt cannot be seen in this view.) Any other means adapted to fasten the clamping elements and the spacing element together in this manner may be employed.

FIG. 4 shows a clamp assembly for three tubes, the spacing element being somewhat different from that shown in FIG. 2 and used in FIG. 3. This spacing element is formed from three leaf spring elements 26, one end of each spring element being formed into a loop 28, and the elements being placed together to form a triangular configuration. The loopless end of each spring element 26 is placed next to the looped end 28 of another spring element.

In practice, the loops 28 are not formed until the ends of the spring elements 26 are swaged together with an encircling band 30. The clamping elements 12 are formed to a normal inside diameter smaller than the periphery of the tubes which are to be clamped together. The clamping elements 12 are then spread apart, fitted over the tubes, and allowed to spring tight. The spacing element 16 is placed in position between the tubes and end loops 28 are formed on each spring element to coincide with the position of the end loops 14 of the clamping elements 12. The clamping elements 12 and the spacing element 16 are then bolted together, the bolts passing through a clamping-element end loop, a spacing-element end loop and another clamping-element end loop in that order.

FIG. 6 shows how the clamping assembly looks when it is employed to clamp five tubes together and FIG. 7 shows how the clamping assembly can be employed to fasten two tubes together. In the latter case, a two-ended spacing element 16 of the plate-separator type should preferably be used.

Obviously many modifications and variations of the present invention are possible in the light of the above teachings. It is therefore to be understood that within the scope of the appended claims the invention may be practiced otherwise than as specifically described.

We claim:

1. A clamping assembly for clamping a plurality of objects in fixed spatial relationship to each other comprising, in combination: a plurality of clamping elements, each formed from a resilient material and having a central loop for encompassing and clamping an object and two spaced end loops projecting outwardly from the periphery of said central loop, the normal clamping dimension of the central loop being somewhat smaller than the largest peripheral dimension of the object to be clamped but being expandable in response to pressure upon said end loops; a spacing element having a number of arms equal to the number of clamping elements, each arm formed with a hole near the end thereof, the size of said spacing element being such as to allow the hole in each arm to coincide with the coincident end loops of two adjacent clamping elements when the clamping elements are clamped around said objects and said objects are placed in position against said spacing elements; and means to fasten together said spacing element and said clamping elements through the medium of said coincident end loops and arm holes.

2. A clamping assembly for clamping a plurality of objects in fixed spatial relationship to each other comprising, in combination: a plurality of loop-like clamping elements, each formed from a resilient material, the inner configuration of the loop being employed to encompass and clamp an object and being shaped complementarily to and somewhat smaller than the peripheral configuration of the object to be clamped, each said element having two spaced end loops projecting outwardly from the periphery of the clamping loop and the inner diameter of the clamping loop being expandable in response to pressure upon said end loops; a spacing element having a number of arms equal to the number of clamping elements, each arm formed with a hole near the end thereof, the size of said spacing element being such as to allow the hole in each arm to coincide with the coincident end loops of two adjacent clamping elements when the clamping elements are clamped around said objects and said objects are placed in position against said spacing element; and means to fasten together said spacing element and said clamping elements through the medium of said coincident end loops and arm holes.

3. An assembly as set forth in claim 2, wherein the longitudinal axes of the arms of said spacing element are equi-angularly spaced.

4. An assembly as set forth in claim 2, wherein the peripheral contour formed by any two adjacent arms of said spacing element substantially corresponds to the complement of a section of the periphery of the object which is to be placed against said peripheral contour.

5. A clamping assembly for clamping a plurality of objects in fixed spatial relationship to each other comprising, in combination: a plurality of loop-like clamping elements, each formed from a resilient material and having a central loop for encompassing and clamping an object and two spaced end loops projecting outwardly from the periphery of said central loop, the normal clamping dimension of the central loop being somewhat smaller than the largest peripheral dimension of the object to be clamped but being expandable in response to pressure upon said end loops; a spacing element comprising a rigid plate having a number of arms equal to the number of clamping elements, each formed with a hole near the end thereof, the size of said spacing element being such as to allow the hole in each arm to coincide with the coincident end loops of two adjacent clamping elements when the clamping elements are clamped around said objects and said objects are placed in position against said spacing element, the peripheral contour formed by any two adjacent arms substantially corresponding to the complement of a section of the periphery of the object which is to be placed against said peripheral contour formed by said two adjacent arms; and means to fasten together said spacing element and said clamping elements through the medium of said coincident end loops and arm holes.

6. A clamping assembly for clamping a plurality of objects in fixed spatial relationship to each other comprising, in combination: a plurality of clamping elements, each formed from a resilient material and having a central loop and two spaced end loops projecting outwardly from the periphery of said central loop, the normal clamping dimension of the central loop being somewhat smaller than the largest peripheral dimension of the object to be clamped but being expandable in response to pressure upon said end loops; a spacing element having a number of arms equal to the number of clamping elements, said arms being formed from concavely curved spring elements, one end of each spring element being formed into a small loop, the loopless end being fastened to that section of a different spring element which is nearest its end loop, the size of said spacing element being such as to allow the loop on each arm to coincide with the coincident end loops of two adjacent clamping elements when the clamping elements are clamped around said object and said objects are placed in position against said spacing element; and means to fasten together said spacing element and said clamping elements through the medium of said coincident end loops and arm loops.

7. A clamping assembly for clamping a plurality of objects in fixed spatial relationship to each other comprising, in combination: a plurality of clamping elements, each formed from resilient wire material bent to form at least one complete central loop, each end of said wire also being formed into a loop, these end loops being spaced from each other and projecting outwardly from the periphery of said central loop, the normal clamping dimension of said central loop being somewhat smaller than the largest peripheral dimension of the object to be clamped but being expandable in response to pressure upon said end loops; a spacing element having a number of arms equal to the number of clamping elements, each arm formed with a hole near the end thereof, the size of said spacing element being such as to allow the hole in each arm to coincide with the coincident end loops of two adjacent clamp elements when the clamping elements are clamped around said objects and said objects are placed in position against said spacing elements; and means to fasten together said spacing element and said clamping elements through the medium of said coincident end loops and arm holes.

8. An assembly as set forth in claim 7, wherein the longitudinal axes of said spacing element are equi-angularly spaced.

9. An assembly as set forth in claim 7, wherein the peripheral contour formed by any two adjacent arms of said spacing element substantially corresponds to the complement of a section of the periphery of the object which is to be placed against said peripheral contour.

References Cited in the file of this patent

UNITED STATES PATENTS

| | | |
|---|---|---|
| 911,583 | Focht | Feb. 9, 1909 |
| 953,394 | Peirce | Mar. 29, 1910 |
| 1,274,717 | Hurley | Aug. 6, 1918 |
| 1,856,109 | Murray | May 3, 1932 |
| 2,032,413 | Hall | Mar. 3, 1936 |
| 2,297,146 | Guirl | Sept. 29, 1942 |
| 2,570,419 | Allen et al. | Oct. 9, 1951 |

FOREIGN PATENTS

| | | |
|---|---|---|
| 672,021 | France | Sept. 9, 1929 |
| 846,867 | Germany | Aug. 18, 1952 |
| 21,826 | Great Britain | of 1895 |
| 10,074 | Great Britain | of 1902 |
| 399,285 | Great Britain | Oct. 5, 1933 |
| 459,970 | Italy | Oct. 11, 1950 |